United States Patent
Arce et al.

(10) Patent No.: US 11,137,287 B2
(45) Date of Patent: Oct. 5, 2021

(54) COMPRESSIVE SPECTRAL IMAGING VIA POLAR CODED APERTURE

(71) Applicant: U.S. Army Research Laboratory, Adelphi, MD (US)

(72) Inventors: Gonzalo R. Arce, Newark, DE (US); Chen Fu, San Jose, CA (US); Michael L. Don, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 55 days.

(21) Appl. No.: 16/245,390

(22) Filed: Jan. 11, 2019

(65) Prior Publication Data

US 2020/0225089 A1 Jul. 16, 2020

(51) Int. Cl.
*G01J 3/02* (2006.01)
*G01J 3/28* (2006.01)

(52) U.S. Cl.
CPC ........... *G01J 3/0229* (2013.01); *G01J 3/0224* (2013.01); *G01J 3/2823* (2013.01)

(58) Field of Classification Search
CPC . G01J 3/0229; G01J 3/2823; G01J 2003/2826
See application file for complete search history.

(56) References Cited

U.S. PATENT DOCUMENTS

| | | | |
|---|---|---|---|
| 5,760,970 A | 6/1998 | Kawamura | |
| 6,057,925 A | 5/2000 | Anthon | |
| 7,336,353 B2 | 2/2008 | Brady et al. | |
| 2007/0058921 A1* | 3/2007 | Lundgren | G01N 21/314 385/147 |
| 2018/0080822 A1* | 3/2018 | Lau | G01J 3/0229 |

OTHER PUBLICATIONS

Chen Fu, "Compressive Spectral Imaging via Polar Coded Aperture", IEEE, 2016 (Year: 2016).*
Michael L. Don, "Compressive imaging via a rotating coded aperture"Applied Optics, 2016 (Year: 2016).*
S.P. Monozova, P.A. Morozov, V.I. Sapritsky, B.E. Lisiansky, N.L. Dovgilov, "VNIIOFI Spectroradiometer Based on a Circular Variable Filter for the Spectral Range from 2.5 um up to 14 um", AIP Conf. Proc. 684, 2003.
D.Cabib, M. Lavi, A. Gil, E. Ohel, J. Dolev, U. Milman, "A Long Wave infrared spectrial imager (7.7 to 12.3) based on a cooled detector array and highresolution Circular Variable Fliter (CVF)", Proc. SPIE 8898, Electro-Optical and infrared systems: Technology and applications X, 88960R, 2013.
G. R. Arce, D. J. Brody, L. Carin, H. Arguello, D.S. Kittle, "An Introduction to Compressive Coded Aperture Spectral Imaging", Signal Processing Magazine, IEEE, 31, 105-115, 2014.

* cited by examiner

*Primary Examiner* — Maurice C Smith
(74) *Attorney, Agent, or Firm* — Christos S. Kyriakou (57) ABSTRACT

Systems, methods, architectures, mechanisms and/or apparatus configured to provide a compressive spectral imager for estimating a spectral image of a rotating scene such as a target scene as viewed from a spinning munition.

14 Claims, 4 Drawing Sheets

```
┌─────────────────────────────────────────────────────────────────┐
│    SPATIALLY CODE AND SPECTRALLY MODULATE AN IMAGE OF A TARGET  │
│ SCENE USING A POLAR CODED APERTURE AND A CIRCULAR VARIABLE FILTER│
│ (CVF) OF AN IMAGING SYSTEM ROTATING WITH RESPECT TO THE SCENE   │
│                                                                 │
│    OPTIONALLY ROTATE ONE OR BOTH OF A POLAR CODED APERATURE     │
│ AND CVF TO COMPENSATE FOR A TARGET IMAGE THAT IS OFFSET WITH    │
│ RESPECT TO AN ARRAY OF SENSORS                              410 │
└─────────────────────────────────────────────────────────────────┘
                                  │
                                  ▼
┌─────────────────────────────────────────────────────────────────┐
│    DETECT THE SPATIALLY CODED AND SPECTRALLY MODULATED IMAGE    │
│  OF THE TARGET SCENE WITH AN ARRAY OF SENSORS OF THE ROTATING   │
│  IMAGING SYSTEM                                             420 │
└─────────────────────────────────────────────────────────────────┘
                                  │
                                  ▼
┌─────────────────────────────────────────────────────────────────┐
│     COLLECT DATA FROM THE ARRAY OF SENSORS OVER TIME        430 │
└─────────────────────────────────────────────────────────────────┘
                                  │
                                  ▼
┌─────────────────────────────────────────────────────────────────┐
│ ESTIMATE THE SPECTRAL IMAGE OF THE SCENE FROM THE DATA COLLECTED│
│  OVER TIME AND A MEASUREMENT MATRIX H DETERMINED IN ACCORDANCE  │
│ WITH SPATIAL CODING AND SPECTRAL MODULATION IMPARTED TO THE IMAGE│
│                       OF THE SCENE                          440 │
└─────────────────────────────────────────────────────────────────┘
```

COMPRESSIVE SPECTRAL IMAGING VIA POLAR CODED APERTURE

GOVERNMENT INTEREST

The embodiments described herein may be manufactured, used and/or licensed by or for the United States Government without the payment of royalties thereon.

FIELD OF THE DISCLOSURE

The embodiments herein generally relate to systems and methods for spectral imaging via rotation of an imager and polar coded aperture.

BACKGROUND

Spectral imaging techniques produce images with vector values containing spectral information about each spatial location of a scene being imaged to provide a datacube representation of the scene that is three-dimensional (two spatial dimensions and one spectral dimension). Given the enormous amount of data generated by such techniques, various spectral, spatial and temporal sampling methods may be employed to reduce the amount if image information to be captured/processed, though at the expense of optical resolution and/or efficiency, leading to long acquisition time, noisy capture data and other problems.

U.S. Pat. No. 7,336,353 provides a method for estimating a spectral image of a scene using translation techniques. A coded image of a scene is formed using a two-dimensional (cartesian) coded aperture (e.g., based on Hadamard matrices), and detected using a two-dimensional detector array of a spectrometer via a spectrally dispersive element such that cross sections of the coded aperture along a direction normal to a dispersion direction are independent. Data from the two-dimensional detector array is collected as the coded image is varied over time by translating the spectrometer relative to the scene such as by lateral or rotational movement. The spectral image is estimated from the data collected and the variation of the coded image over time.

Unfortunately, the various prior art arrangements suffer from a number of deficiencies, such as detector-constrained spatial/spectral resolution, the use of multiple sets of relay optics and so on.

SUMMARY

Various deficiencies in the prior art are addressed by systems, methods, architectures, mechanisms and/or apparatus configured to provide a compressive spectral imager for estimating a spectral image of a rotating scene such as a target scene as viewed from a spinning munition.

A method according to an embodiment comprises spatially coding and spectrally modulating an image of the scene using a polar coded aperture and a circular variable filter (CVF) of an imaging system rotating with respect to the scene; detecting the spatially coded and spectrally modulated image of the scene with an array of sensors of the rotating imaging system; collecting data from the array of sensors over time; and estimating the spectral image of the scene from the data collected over time and a measurement matrix H determined in accordance with spatial coding and spectral modulation imparted to the image of the scene.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various deficiencies in the prior art are addressed by systems, methods, architectures, mechanisms and/or apparatus configured to provide a compressive spectral imager for estimating a spectral image of a rotating scene such as a target scene as viewed from a spinning munition.

Figure 1:
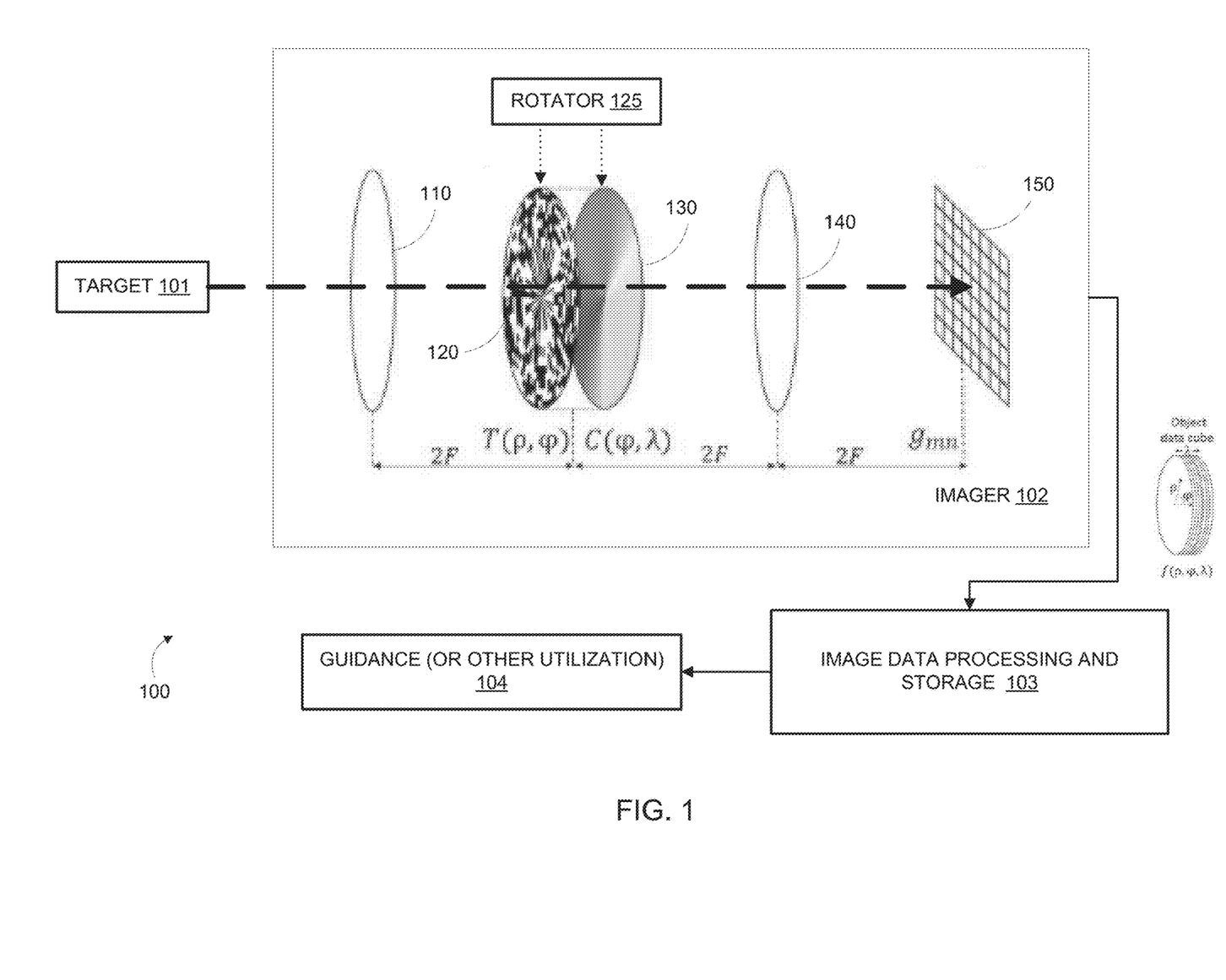
FIG. 1 depicts a system utilizing an optical layout of a polar coded aperture compressive spectral imaging architecture according to an embodiment herein.

FIG. 1 depicts a system utilizing an optical layout of a polar coded aperture compressive spectral imaging architecture according to an embodiment herein. In particular, FIG. 1 depicts a scene or target to be imaged 101, and imager 102, an image data processing and storage device 103 and a guidance/utilization device 104. In one embodiment, it is contemplated that the imager 102, image data processing and storage device 103 and guidance/utilization device 104 are mounted on a spinning munition being directed toward the target 101.

The optical layout of a polar coded aperture compressive spectral imaging architecture is depicted in FIG. 1 as imager 102. Generally speaking, the imager 102 comprises an objective lens 110, a polar coded aperture 120, a continuous variable bandpass filter (CVF, such as a polar color filter) 130, and imaging lens 140 and an array of image sensors/detectors such as a focal plane array (FPA) detector 150. As depicted, the polar coded aperture 120 and continuous variable bandpass filter 130 are placed at the focal plane of the objective lens 110 as well as the imaging lens 140 and provide thereby spatial coding and spectral modulation of imagery of the target/scene 101 detected by the FPA 150, which is depicted as being placed at the focal plane of the imaging lens 140. The FPA 150 illustratively comprises an array of relatively low resolution sensors.

Figure 5:
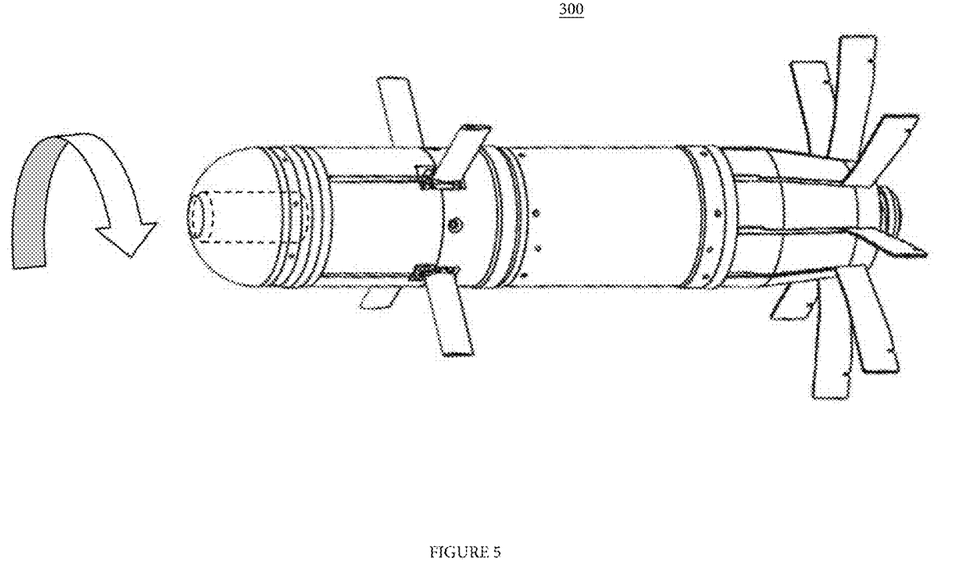
FIG. 5 depicts a spinning munition.

The imager 102 is mounted on a spinning platform, such as a spinning munition 300 (or electronically controlled rotary actuator or some other rotating/spinning device). That is, various embodiments contemplate an imaging system or imager formed using this architecture and mounted on a spinning munition 300, where the imager is rotating together with the munition. All optical elements are relatively static in that there is no need for moving elements inside of the imaging system or imager.

As the imager 102 rotates, compressive projections are sequentially captured with the embedded spatial coding and spectral modulation. A target/scene 101 is first projected onto the focal plane of the objective lens, where it is modulated in multiple spatial and spectral dimensions by the polar coded aperture and a CVF. The resulting coded/modulated scene is projected on a low resolution sensor array, forming a compressed measurement "shot." During a full rotation of the imager, multiple snapshots are collected and used for reconstructing a spectral image cube.

A spectral image is reconstructed from the projections by the image data processing and storage device 103. The reconstructed spectral image may be utilized by, illustratively, a guidance/utilization device 104 such as for controlling a trajectory of the spinning munition in a manner tending to guide the spinning munition toward the target 101. Mechanisms for guiding the spinning munition are known, such as by selectively deploying small aerodynamic structures during portions of full rotations of the spinning munition to thereby urge the spinning munition toward a desired trajectory.

Figure 2:
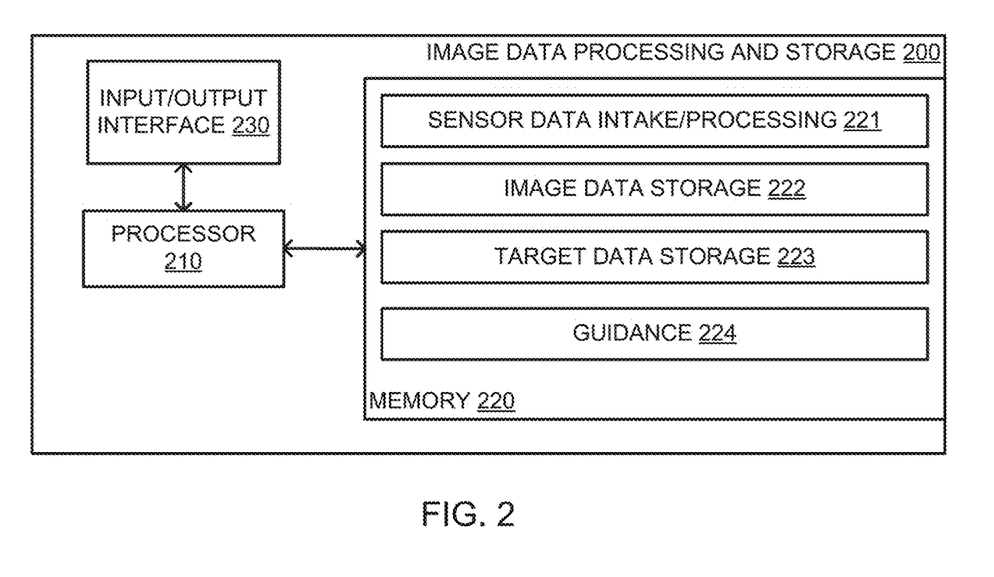
FIG. 2 depicts an exemplary image data processing and storage device suitable for use in the system of FIG. 1.

FIG. 2 depicts an exemplary image data processing and storage device suitable for use in the system of FIG. 1. In particular, FIG. 2 depicts a high-level block diagram of a computing device, such as a computing device mounted within a spinning munition as part of an imaging system such as described herein, suitable for use in performing the image data processing and storage functions as described herein with respect to the various figures and suitable for use as the image data processing and storage device 103 of the system 100 of FIG. 1.

As depicted in FIG. 2, image data processing and storage device 200 includes a processor element 210 (e.g., a central processing unit (CPU) and/or other suitable processor(s)), a memory 220 (e.g., random access memory (RAM), read only memory (ROM), and the like) and an input/output (I/O) interface 230.

In operation, the primary function of the image data processing and storage device 200 is to continually receive/collect image data from the focal plane array 105 of the imager 102 and use that image data, in conjunction with a measurement matrix H, to estimate a spectral image of the target/scene.

Specifically, the memory 220 is depicted as including a sensor data intake/processing module 221, which module is operative to receive image data from the focal plane array 105 (or other sensor array used for this purpose), and process this data with the measurement matrix H to estimate a spectral image of the target/scene thereby. In the embodiment of FIG. 2, the memory 220 also includes image data storage 222 for storing processed image information, such as a high resolution data cube representative of the target/scene as constructed or while being constructed.

Optionally, the memory 220 is depicted as including target data storage 223 for storing target image information, such as a high resolution data cube representative of a specific target/scene as fully constructed or partially constructed and of a form suitable for rapid comparison purposes with data stored within the image data storage 222.

Optionally, the memory 220 is depicted as including a guidance module 224 operative to trigger guidance functions associated with the spinning munition, such as to adapt the trajectory of the spinning munition in a manner tending to keep the target/scene image centered.

It will be appreciated that the functions depicted and described herein may be implemented in hardware and/or in a combination of software and hardware, e.g., using a general purpose computer, one or more application specific integrated circuits (ASIC), and/or any other hardware equivalents. It will be appreciated that image data processing and storage device 200 depicted in FIG. 2 provides an exemplary computing/processing architecture suitable for implementing the center processing and related functions as described herein. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

The image data processing functions performed in accordance with the various embodiments, such as those performed by the image data processing and storage device 200, will now be described in more detail.

Compressive Spectral Imaging Via Polar Coded Aperture

A spectral imager according to various embodiments processes light received from a target/scene using a CVF to provide frequency/spectral modulation, and a polar coded aperture to provide spatial coding/modulation. Successive samples of spatially coded and spectrally modulated imagery are captured by a low resolution imager during rotation, and compressive sensing theory is employed to reconstruct a high resolution data cube representative of the target/scene.

In various embodiments, the design of the aperture code is optimized for compressive sensing through rotation so that a high resolution image can be recovered using the fewest number of measurements. Resolution is increased in both the spatial and spectral dimensions. Unique features of the various embodiments include the use of an aperture code that has been designed for compressive sensing through rotation, as well as an aperture code used in conjunction with a circular variable filter for compressive sensing. Various embodiments find particular utility within the context of use on a spinning munition for target detection, as a standalone spectral imager for remote sensing and so on. The various embodiments may be used to provide a stand-alone high resolution spectral imager. The various embodiments also find utility within the context of a wide range of commercial uses in mineralogy, agriculture, food processing, surveillance, and medical care.

In order to perform image reconstruction, it is important to model the image sensing process. In compressive sensing, this is accomplished through the formulation of a measurement matrix. The inventors have developed several sensing models for this system; namely, a discrete rotation sensing model and a continuous rotation sensing model.

The discrete rotation sensing model was assumes that the spectral imager is static during each FPA integration period. This assumption holds true when the imager shutter speed is much faster than the imager spinning speed. However, in low light conditions or in the situations where the relevant platform (e.g., munition) is spinning quickly, this assumption will lead to a rotation blur in the reconstructed images.

The continuous rotation sensing model characterizes the imager's continuous rotation during measurement capture. This model is generally a more practical model when the imager is mounted on spinning devices, such as munitions, but requires a precise knowledge of the spinning speed during each snapshot as well as accurate synchronization between the rotation platform and FPA integration.

For simplicity, the various concepts described herein with respect to the embodiments will be described within the context of the discrete rotation sensing model.

The polar coded aperture preferably utilizes a rings-spokes structure to perform block-unblock coding of the target/scene. This rings-spokes structure is illustrated in, for example, FIG. 3A. Thus in the mathematical model, this polar coded aperture has its pixels indexed by the spokes and rings, denoted as $t_{sr}$, where s denotes the spokes and r indexes the rings. This indexing process can be viewed as representing the polar pixels in the discrete polar coordinates. Since a lower resolution sensor is applied, the spatial reconstruction resolution is determined by the resolution of the polar coded aperture.

The desired image cube consists of three dimensions: two spatial dimensions indexed by rings and spokes, as well as one spectral dimension indexed by the spectral band k. Thus the 3D image cube is represented as $f_{srk}$. The polar coded aperture providing spatial modulation is represented as $t_{sk}$. The circular variable filter provides distinct spectral modulation along its angular position. Thus the spectral modulation for the $(s; r; k)^{th}$ data voxel is denoted as $c_{srk}$. The sensors, on the other hand, are arranged in rows and columns. Thus for $N^2$ sensors on the FPA, each sensor measurement is denoted as $g_{mn}$, where m and n index the rows and columns. K denotes the number of snapshots captured during a $2\pi$ rotation. The $\ell^{th}$ snapshot measurements on the FPA are shown below as equation 1:

$$g^\ell_{mn} = \sum_r \sum_s \sum_k w^\ell_{smn} t^\ell_{sr} c^\ell_{srk} f_{srk}, \quad (1)$$

where $\ell$ accounts for the transformation between polar shaped pixels and square FPA sensors. This forward model equation can be also expressed in a matrix representation as shown below as equation 2:

$$g^\ell = W^\ell P^\ell f \quad (2)$$
$$= H^\ell f,$$

where W represents the spatial transformation and compression, while P accounts for the spatial coding, spectral modulation and spectrum integration, and where $H^\ell = W^\ell P^\ell$ is the measurement matrix for the $\ell^{th}$ shot.

The imager rotation between snapshots provides new spatial and spectral coding to the scene. The relationship between the sensing matrices of two distinct snapshots is easily attained by performing permutation operators on W and P, giving the measurement matrix $H^\ell$ for each snapshot. Then the complete sensing procedure during a 27 rotation is as shown below as equation 3:

$$g=Hf, \quad (3)$$

where vector g is a collection of FPA measurements from all K snapshots. And where $H=[(H^1)^T, (H^2)^T, \ldots, (H^K)^T]^T$ is the measurement matrix.

Due to the spatial and spectrum compression, the measurement matrix H is highly under-determined with a limited number of snapshots. The inverse of this under-determined system is attained by exploiting the sparsity in the spatial-spectral data cube. With an appropriate basis, such as a 3D DCT or a 3D Wavelet basis, the data cube is represented as $f=\Psi\theta$, where $\Psi$ is the Kronecker basis and $\theta$ contains the corresponding coefficients. The sparse coefficients are recovered through a suitable compressive sensing recovery algorithm such as $\ell_1$ minimization with equality constraints per equation 4:

$$\min_\theta \|\theta\|_1 \text{ subject to } g = H\Psi\theta. \quad (4)$$

or the following $\ell_1$ regularized minimization problem, shown below as equation 5:

$$\hat\theta = \arg\min_\theta \|g - H\Psi\theta\|^2 + \tau\|\theta\|_1, \quad (5)$$

where $\tau$ is a regularization constant. The spectral image cube is then recovered by performing an inverse basis transformation.

Figure 3A:
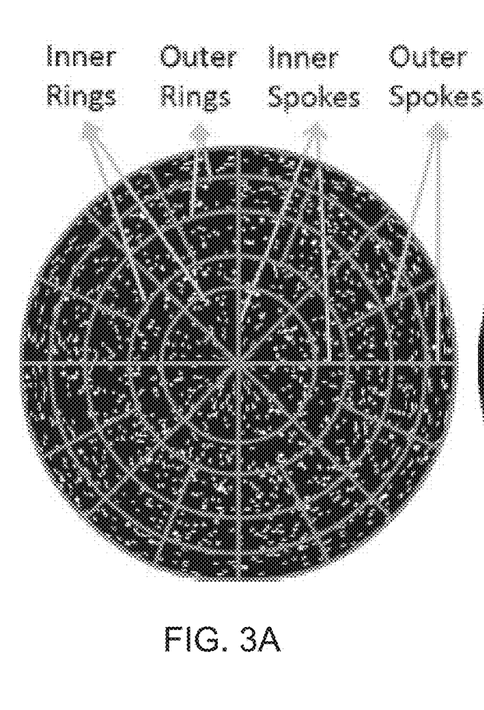
FIG. 3A depicts a random coded polar coded aperture with a ring-spoke coordinate system superimposed thereon suitable for use in the system of FIG. 1.

FIG. 3A depicts a random coded polar coded aperture with a ring-spoke coordinate system superimposed thereon suitable for use in the system of FIG. 1. In particular, it can be seen that the polar coded aperture has 20 inner rings with 128 inner spokes and 54 outer rings with 256 outer spokes, and where a white dot represents an unblock polar pixel and the black pixels are blocked.

Figure 3B:
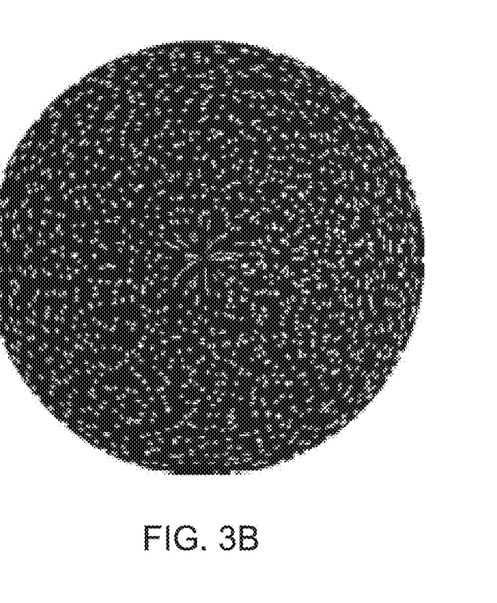
FIG. 3B depicts an optimized coded polar coded aperture suitable for use in the system of FIG. 1.

FIG. 3B depicts an optimized coded polar coded aperture suitable for use in the system of FIG. 1. In particular, the polar coded aperture of FIG. 3 is optimized in accordance with various techniques discussed below. It is noted that the pixels are separated more in the optimized coded aperture of FIG. 3B than in the random aperture of FIG. 3A, indicating that a uniform sensing is achieved. Experiments performed by the inventors have verified the probability distribution of image cube voxel and sensors in the sensing process.

Figure 4:
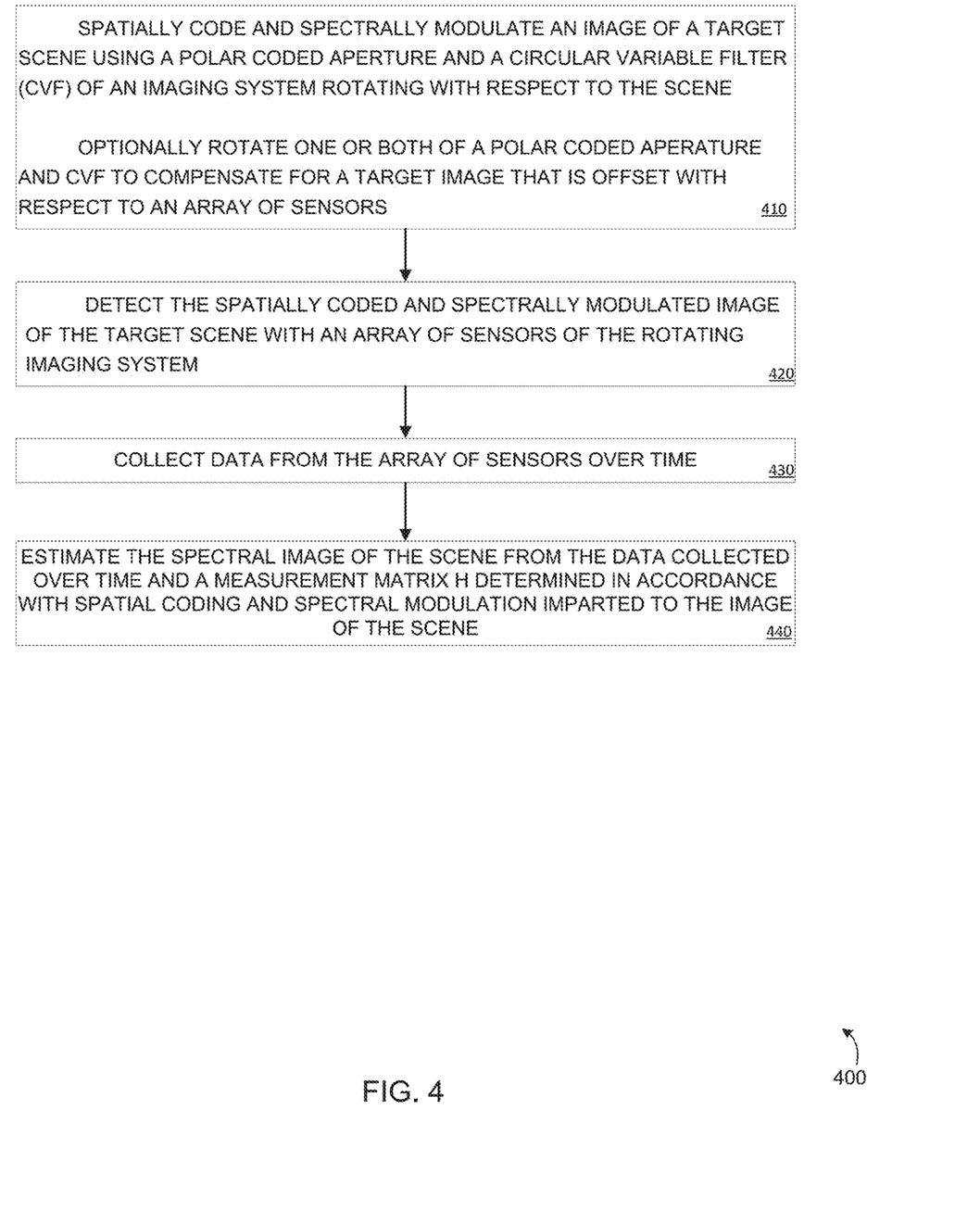
FIG. 4 depicts a flow diagram of a method of polar coded aperture compressive spectral imaging according to an embodiment.

FIG. 4 depicts a flow diagram of a method of polar coded aperture compressive spectral imaging according to an embodiment. In particular, the method 400 of FIG. 4 is primarily directed to the optical processing steps performed by the polar coded aperture compressive spectral imaging architecture described above with respect to the various figures.

At step 410, an image of a target scene is spatially coded and spectrally modulated using, respectively, a polar coded aperture and a circular variable filter within an imaging system rotating with respect to the scene, such as within a spinning munition. Optionally at step 410, a rotating mechanism configured to rotate one or both of the polar coded aperture and the CVF to compensate for an off-center image with respect to the array of sensors.

At step 420, the spatially coded and spectrally modulated image of the target scene is detected by an array of sensors of the imaging system rotating with respect to the scene.

At step 430, data is collected from the array of sensors over time.

At step 440, the spectral image of the target scene is estimated using the data collected over time from the array of sensors and a measurement matrix H determined in accordance with the spatial coding and spectral modulation imparted to the image of the target scene.

Polar Coded Aperture Optimization

FIG. 3A depicts a polar coded aperture structure in which 50% random binary coding patterns have been used because this is statistically incoherent with the sparsity basis. In practice, randomness is found by the inventors to generate variation in the reconstruction quality for many compressive spectral imaging systems. One way to address this problem is by placing statistical constraints on the randomness. For example, blue noise binary coding is shown to perform much better than white noise binary patterns in some compressive imaging systems. The blue noise patterns tend to preserve the high frequency information in images and the sensing process tends to be more uniform across the scene. For multi-snapshot compressive imaging systems, complementary binary coding usually outperforms non-complementary random coding.

A set of multi-shot aperture patterns with complementary constraints results in uniform sensing: each pixel or voxel in the scene is sensed exactly once in all collections of compressed measurements. On the other hand complementary coding affects the transmittance of the coded aperture since it is inversely proportional to the number of snapshots. This may result in a significant reduction of light throughput in the imaging system for a high number of snapshots. Unfortunately, the polar coded aperture spectral imaging system falls into this category: a relatively high number of snapshots (e.g., anywhere from 16 to 128 simulations) is required for high reconstruction quality due to the spatial-spectrum super-resolution nature of the system.

Therefore the inventors have developed a new coded aperture design strategy that addresses uniform sensing while controlling the aperture transmittance.

The new coded aperture design strategy considers two coded aperture design criteria; namely, that the data voxels should be uniformly sensed, and that the FPA sensors should uniformly sense the data cube.

The summation along the columns of the measurement matrix H represents the sensing for each data voxel. The summation along the rows of H represents the sensing across sensors. Thus the desired cost function breaks into two parts. The first part evaluates the non-uniformity of the sensed data voxels, as shown in equation 6 below:

$$E_1 = \sum_{j=1}^{SRL} \left( \sum_{i=1}^{KN^2} H_{ij} - m_1 \right)^2 = \sum_{j=1}^{SRL} \left( \sum_{\ell} \sum_{i=1}^{N^2} H_{ij}^{\ell} - m_1 \right)^2, \quad (6)$$

where the data cube has the dimension of S×R×L. K snapshot measurements are captured on a N×N sensor array. $H_{ij}^{\ell}$ is the element in the $i^{th}$ row and $j^{th}$ column of the $\ell^{th}$ snapshot sensing matrix. Here $m_1$=median $(\Sigma_{i=1}^{KN^2} H_i)$, where $H_i$ is the $i^{th}$ row of H. The second part of the cost function measures the non-uniformity across the sensors, expressed as shown in equation 7 below:

$$E_2 = \sum_{i=1}^{KN^2} \left( \sum_{j=1}^{SRL} H_{ij} - m_2 \right)^2 = \sum_{\ell=1}^{K} \sum_{i=1}^{N^2} \left( \sum_{j=1}^{SRL} H_{ij}^{\ell} - m_2 \right)^2, \quad (7)$$

where $m_2$=median$(\Sigma_{j=1}^{SRL} H_j)$ and $H_j$ is the $j^{th}$ column of H. The cost function is then E=E1+τE2, where the parameter τ is set around SRL/KN². A direct binary search (DBS) algorithm is applied to solve this minimization problem. The DBS algorithm is an efficient algorithm in solving binary matrix related optimization problems. This iterative algorithm scans every pixel in the coding pattern and performs toggling and swapping operations between each binary pixel and its eight neighbors. It evaluates the changes of the cost function for each operation and only keeps the certain operation that results in the highest reduction of the cost function. These sequential operations guarantee the convergence of the cost function to its local minimum. The main drawback of DBS is its slow computing speed. The cost function value, or more efficiently, the changes of the cost function value need to be calculated for each valid toggle and swap operation. Thus the algorithm can be highly accelerated by simplifying the cost function calculation.

A simplified cost function is derived and an efficient DBS algorithm is Proposed within the context of various embodiments.

The matrix $W^s$ represents the polar-rectangular transformation, and an entry $W_{ij}^s$ represents the percentage of the $j^{th}$ polar pixel in coded aperture covered by $i^{th}$ sensor. It's assumed that the sensor array is large enough to sense all polar pixels. Thus the elemental summation in each column is 1, $\Sigma_{i=1}^{N^2} W_{ij}^s = 1$.

Then, as shown below in equation 8:

$$\sum_{\ell=1}^{K} \sum_{i=1}^{N^2} H_{ij}^{\ell} = \sum_{\ell=1}^{K} \sum_{i=1}^{N^2} W_i^{\ell} P_j^{\ell} = \sum_{\ell=1}^{K} \left( \sum_{i=1}^{N^2} W_i^{\ell} \right) P_j^{\ell} \quad (8)$$

$$= \sum_{\ell=1}^{K} 1 P_j^{\ell} = \sum_{\ell=1}^{K} \sum_{c=1}^{SR} P_{cj}^{\ell}.$$

Matrix $P^{\ell}$ is a concatenation of L diagonal matrices, where L is the number of spectral bands, such that per equation 9:

$$E_1 = \sum_{j=1}^{SRL} \left( \sum_{\ell=1}^{K} \sum_{c=1}^{SR} P_{cj}^{\ell} - m_1 \right)^2 \quad (9)$$

$$= \sum_{k=1}^{L} \sum_{r=1}^{R} \sum_{s=1}^{S} \left( \sum_{\ell}^{K} t_{sr}^{\ell} c_{srk}^{\ell} - m_1 \right)^2.$$

Therefore, $E_1$ can be calculated directly from the spectral filtering $c_{srk}^{\ell}$ and the aperture code $t_{sr}^{\ell}$. Matrix $W^s$ has no influence on $E_1$. Thus the matrix multiplication $W^{\ell}P^{\ell}$ is unnecessary, simplifying the calculation.

Imager rotation occurs between each snapshot. Relative to the imager, the polar voxels of the scene circularly shift between snapshots. This leads to a permutation in the columns of the measurement matrix for each snapshot. Mathematically the $\ell^{th}$ snapshot measurement matrix $H^\ell$ can be calculated from permutation on column indexes j of the $(\ell-1)^{th}$ snapshot measurement matrix $H^{\ell-1}$. Thus the summations along columns of the measurement matrices in two different snapshots are the same, i.e., $\sum_{j=1}^{SRL} H_{i,j}^\ell = \sum_{j=1}^{SRL} H_{i,j}^{\ell-1}$. Thus the second part of the cost function can be simplified as per equation 10 below:

$$E_2 = K \sum_{i=1}^{N^2} \left( \sum_{j=1}^{SRL} H_{ij}^1 - m_2 \right)^2 = K \sum_{i=1}^{N^2} \left( \sum_{j=1}^{SRL} W_i^1 P_j^1 - m_2 \right)^2 \quad (10)$$

$$= K \sum_{i=1}^{N^2} \left( W_i^1 \left( \sum_{j=1}^{SRL} P_j^1 \right) - m_2 \right)^2.$$

Defining the vector $P = \sum_{j=1}^{SRL} P_j^1$, gives, per equation 11 below:

$$E_2 = K \sum_{i=1}^{N^2} (W_i^1 p - m_2)^2 \quad (11)$$

$$= K \| W^1 p - m_2 \|_2^2,$$

where a matrix-vector multiplication $w^1 p$ · replaces the calculation of the matrix multiplication $W^\ell P^\ell$ K times.

Besides simplifying the cost function, the optimization algorithm itself can be designed more efficiently for faster computation. As the DBS algorithm performs local searches sequentially across all coded aperture pixels, only a small portion of pixels are affected by each local search. However, computing E1 and E2 requires operations on all aperture pixels, resulting an inefficient computation strategy. Instead of computing $E_1$ and $E_2$ for each swap and toggle operation, an efficient algorithm should compute the updates of $E_1$ and $E_2$, only involving the affected pixels in the recalculation.

It should be pointed out that this optimization algorithm is sensitive to the initial binary pattern for the following two reasons: First, the DBS is an iterative algorithm searching for a local minimum. Secondly the median values $m_1$ and $m_2$ are calculated based on the initial sensing matrix H. More specifically, the median values are related with the transmittance of the coded aperture, where transmittance of a binary coded aperture is defined as $\sum_{i,j} T_{i,j}/SR$ with a range from 0 and 1. A random binary coded aperture with 50% open has a transmittance of 0.5. A lower transmittance coded aperture leads to a sparser sensing matrix with smaller $m_1$ and $m_2$ values. This provides the flexibility to control the transmittance of the optimized coded aperture by treating the transmittance of the initial coded aperture as a parameter. Thus the optimization algorithm should be run a number of times, initialized with random coded apertures with varying amounts of transmittance. This will result in corresponding optimized patterns with various levels of transmittance, which can then be down-selected by measuring simulated reconstruction performance.

Advantageously, the various embodiments apply a novel polar coded aperture specifically designed for rotation, instead of the conventional squared shaped coded aperture is known in the art. In particular, the polar coded aperture design enables an increase in resolution as compared to conventional coded apertures. Computer simulations have shown high quality image reconstruction with a 4:1 compression ratio.

Further, the various embodiments apply a circular variable filter (CVF) to provide spectral modulation. The CVF has several advantages compared with known dispersive elements, such as a wider spectral range and a more linear spectral response. The CVF is also better-suited for the imager rotation. In various embodiments, the polar coded aperture and the CVF are integrated in one focal plane, thereby reducing the amount of relay optics necessary to implement a compressive spectral imaging device.

In the various embodiments discussed herein, the code geometry may be configured as a polar pattern with R rings and S spokes, with S/R=4. The outer radius of ring r is $\Delta\sqrt{r}$, with $\Delta$ denoting the outer radius of the first ring.

In the various embodiments discussed herein, the code geometry may be configured as an Inner/Outer polar geometry with $S_{in}$ and $S_{out}$ inner and outer spokes, and $R_{in}$ and $R_{out}$ inner and outer rings. The total number of cells is $S_{in}^2$, with $S_{out}=2S_{in}$, $R_{in}\approx 0.156 S_{in}$, and $R_{out}\approx 0.421 S_{in}$ such that $R_{in} S_{in} + R_{out} S_{out} = S_{in}^2$. For example, for $128^2$ cells, $S_{in}=128$, $S_{out}=256$, $R_{in}=20$, and $R_{out}=54$. The outer radius of ring r is $\Delta\sqrt{r}$ for the inner rings, and $\Delta\sqrt{2r-R_{in}}$ for the outer rings.

In the various embodiments discussed herein, the code optimization may comprise using an random code of, illustratively, 0.12 transmittance.

In the various embodiments discussed herein, a number of measurements may be selected based on a desired PSNR.

In the various embodiments discussed herein, an increasing number of sensors (FPA size) provides improved performance, and a minimum number may be selected as is $$M^2 \geq \frac{\kappa N}{S_{in}},$$

where N is the total number of pixels, $\kappa$ is the compressive sensing ratio, and $M^2$ is the FPA size. In the various embodiments discussed herein, it is noted that an increasing number of spectral bands require an increasingly narrower filter bandwidth; in various embodiments a bandwidth of y=0.1 is used for 128 bands. Further, as the filter bandwidth is narrowed to support more spectral bands, more snapshots are required so that every part of the image is sensed along every bandwidth.

In various embodiments, the system 100 of FIG. 1 is modified to provide a monochromatic compressive sensing (CS) by avoiding use of the Polar Color Filter 130 and using a polar coded photomask and a sensor array of reduced size (cost) for a similar resolution. In this embodiment, a slightly different code optimization scheme than that discussed above with respect to the PCF embodiments is used.

Off-Center FPA Embodiments

In various embodiments, the code and filter are adapted for rotating with respect to off-center focal plane array (FPA), monochrome or spectral. For example, (referring to FIG. 1) if the FPA is placed off-center, then the code and filter may be rotated in front of the FPA. That is, various embodiments contemplating an off-center FPA may further include a rotating mechanism 125 such as an actuator or other means to rotate the code and/or filter in front of the FPA.

With respect to code geometry, various embodiments contemplate a ring/spoke geometry with equal area cells, wherein an outer radius of ring r is given by equation 12:

$$\sqrt{r(\Delta^2+2\Delta r_0)+r_0^2}, \quad (12)$$

where $r_0$ is the inner most radius and $\Delta$ is the width of the first ring. For a square image with R rings and $S_{im}$ spokes, $R=S_{im}$, the code has R rings and S spokes, with the number of spokes determined by the FPA size, such as discussed below.

In particular, for $r_0 \gg \Delta$, equal width rings can be used to produce approximately equal area cells such that, illustratively, the height of the rings may be adapted to make each pixel have substantially the same area.

It is contemplated that a sensing model is provided and is similar to the main application, except that only the portion of the code and filter overlapping the image are used for each snapshot, indexed by and $S_{im}$ and $k_{im}$. In this case, $t^\ell$ and $c^\ell$ also model the rotation of the code and filter with respect to the FPA since they are no longer relatively static, such as given by the following equation 13:

$$g_{mn}^\ell = \sum_r \sum_{s_{im}} \sum_{k_{im}} w_{srmn} t_{sr}^\ell c_{srk}^\ell f_{srk}. \quad (13)$$

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

The various embodiments advantageously provide images with a higher spatial and spectral resolution than the detector. This makes it possible to use a smaller detector which lowers cost and reduces system noise. The various embodiments employ a novel polar coded aperture specifically designed for rotation, which aperture design enables the increased resolution.

The various embodiments do not require a dispersive element; rather, the various embodiments contemplate a spectral imager that applies the circular variable filter (CVF) for spectral modulation. The CVF has several advantages compared with dispersive elements, such as a wider spectral range and the linearity of spectral response. The CVF is also better-suited for the imager rotation. Further, the disclosed polar coded aperture and the CVF can be integrated in one focal plane such that only one set of relay optics is needed, resulting in a more compact imager.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for spectral imaging of a scene, comprising:
spatially coding and spectrally modulating an image of the scene using a polar coded aperture and a circular variable filter (CVF) of an imaging system rotating with respect to the scene;
detecting the spatially coded and spectrally modulated image of the scene with an array of sensors of the rotating imaging system;
collecting data from the array of sensors over time; and
estimating the spectral image of the scene from the data collected over time and a measurement matrix H determined in accordance with spatial coding and spectral modulation imparted to the image of the scene
wherein a total number of cells is $S_{in}^2$, with $S_{out}=2S_{in}$, $R_{in} \approx 0.156 S_{in}$, and $R_{out} \approx 0.421 S_{in}$ such that $R_{in} S_{in} + R_{out} S_{out} = S_{in}^2$.

2. The method of claim 1, wherein the measurement matrix H is further determined in accordance with one or more of a resolution of the array of sensors and a number of sensor measurements.

3. The method of claim 2, wherein the measurement matrix H is modified to account for continuous motion.

4. The method of claim 1, wherein the polar coded aperture comprises a polar shaped coded aperture with a rings-spoke structure configured to impart block-unblock coding to light passing therethrough.

5. The method of claim 4, wherein a ring spacing of the rings-spoke structure is selected to provide cells of equal area.

6. The method of claim 4, wherein an optimizing of shapes is provided by selectively using inner and outer sections.

7. The method of claim 4, wherein the rings-spoke structure is configured to optimize a code pattern.

8. The method of claim 4, wherein the polar coded aperture imparts a ring index and spoke index coding of scene pixels to provide polar pixel coding of spatial information of the scene.

9. The method of claim 1, wherein the imaging system is configured to be mounted on spinning munition.

10. The method of claim 1, wherein the image of the scene is received at the rotating imaging system via an objective lens of the rotating imaging system.

11. The method of claim 1, wherein the polar coded aperture comprises a polar shaped coded aperture with a code geometry configured as a polar pattern with R rings and S spokes, with S/R=4.

12. The method of claim 11, wherein the outer radius of ring r is $\Delta\sqrt{r}$, with $\Delta$ denoting the outer radius of the first ring.

13. The method of claim 1, wherein the polar coded aperture comprises a polar shaped coded aperture with a code geometry configured as an Inner/Outer polar geometry with $S_{in}$ and $S_{out}$ inner and outer spokes, and $R_{in}$ and $R_{out}$ inner and outer rings.

14. The method of claim 1, further comprising rotating one or both of the polar coded aperture and the CVF to compensate for a target image that is off-center with respect to the array of sensors.

* * * * *